US005518417A

United States Patent [19]

Liu

[11] Patent Number: 5,518,417
[45] Date of Patent: May 21, 1996

[54] MULTIPLE ELECTRICAL SOCKET

[76] Inventor: Yun-Tsai Liu, P.O. Box 1750, Taichung City, Taiwan

[21] Appl. No.: 408,846

[22] Filed: Mar. 23, 1995

[51] Int. Cl.⁶ ................................. H01R 13/72
[52] U.S. Cl. ................... 439/501; 439/4; 242/379; D13/137; D13/140
[58] Field of Search ................. 439/501, 4; 242/378.4, 242/379; D13/137, 138, 139, 140

[56] References Cited

U.S. PATENT DOCUMENTS

| | | | |
|---|---|---|---|
| 3,248,069 | 4/1966 | Nicholas | 242/379 |
| 3,821,496 | 6/1974 | Malone | 439/4 |
| 4,284,180 | 8/1981 | Masters | 439/4 |
| 5,236,371 | 8/1993 | Mattis | 439/501 |

Primary Examiner—Gary F. Paumen
Assistant Examiner—T. C. Patel
Attorney, Agent, or Firm—Charles E. Baxley

[57] ABSTRACT

A multiple electrical socket comprises a housing, a base, two reels, two fastening blocks, a shaft, and two extension cords provided respectively with an electrical socket fastened thereto. The reels and the fastening blocks are mounted on the shaft which is located by the base. The extension cords are wound respectively on the reels such that the extension cords can be pulled out of the housing, and that the extension cords can be retracted respectively by a winding spring mounted on the shaft.

4 Claims, 6 Drawing Sheets

MULTIPLE ELECTRICAL SOCKET

FIELD OF THE INVENTION

The present invention relates generally to an electrical fixture, and more particularly to a multiple retractable electrical socket.

BACKGROUND OF THE INVENTION

The conventional electrical socket has an extension cord which is fastened thereto and has a fixed length. Such a conventional electrical socket as mentioned above is of a little help if its extension cord is not long enough to reach a place where the electrical socket is intended to be used. In addition, a larger storage place is needed to accommodate the long extension cord of the conventional electrical cord. Moreover, the conventional electrical socket having a long extension cord can be rather aggravating to its user when the extension cord is found to be too long to be disposed of properly.

SUMMARY OF THE INVENTION

It is therefore the primary objective of the present invention to provide a multiple electrical socket comprising a plurality of sockets which are provided respectively with a retractable extension cord fastened thereto.

It is another objective of the present invention to provide a multiple electrical socket with a decorative housing which can be attached to a power source as a decoration when the multiple electrical socket is not in use.

The foregoing objectives, features and advantages of the present invention will be more readily understood upon a thoughtful deliberation of the following detailed description of the present invention in conjunction with the accompanying drawings.

DETAILED DESCRIPTION OF THE INVENTION

Figure 1:
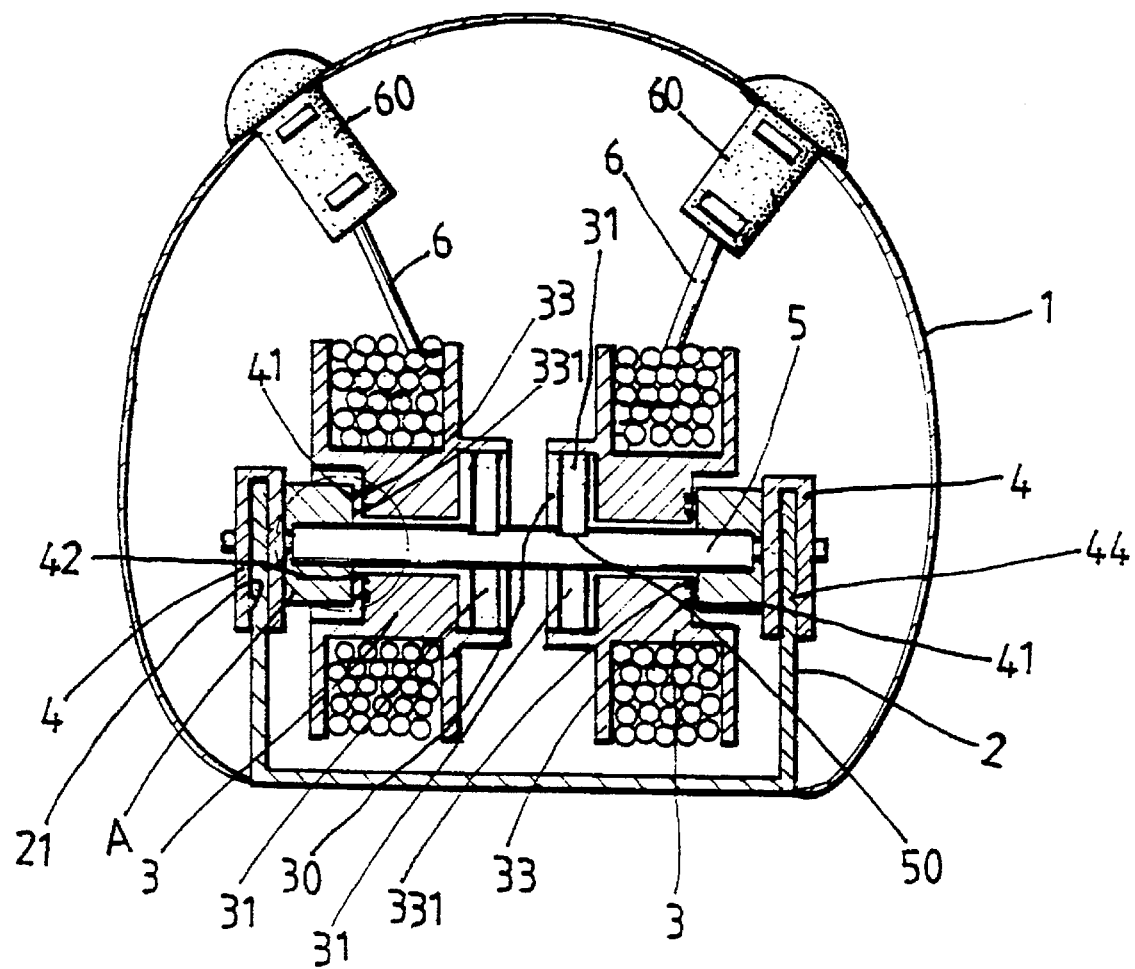
FIG. 1 shows a sectional view of the present invention in combination.
Figure 2:
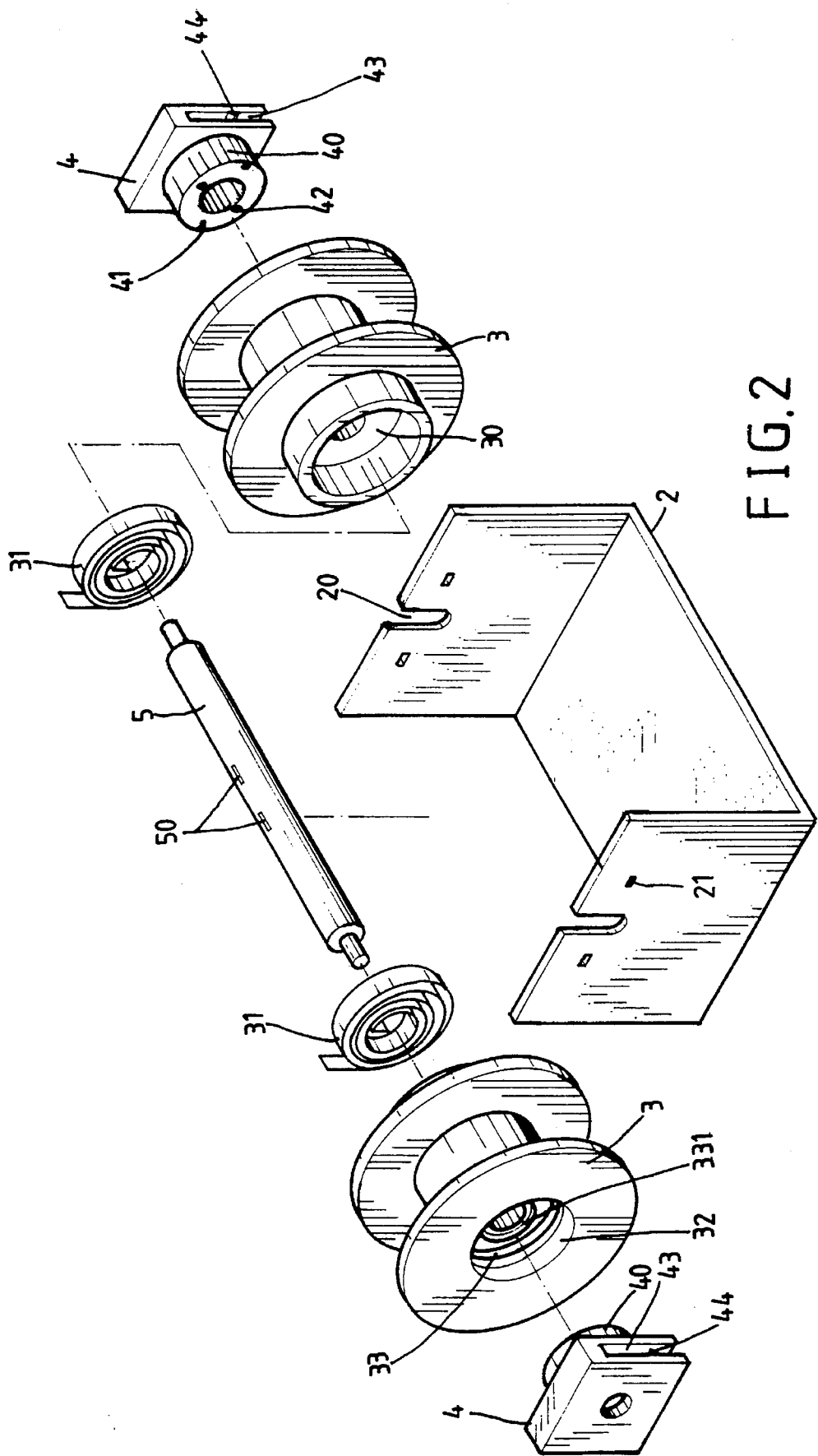
FIG. 2 shows a partial exploded view of the present invention.
Figure 3:
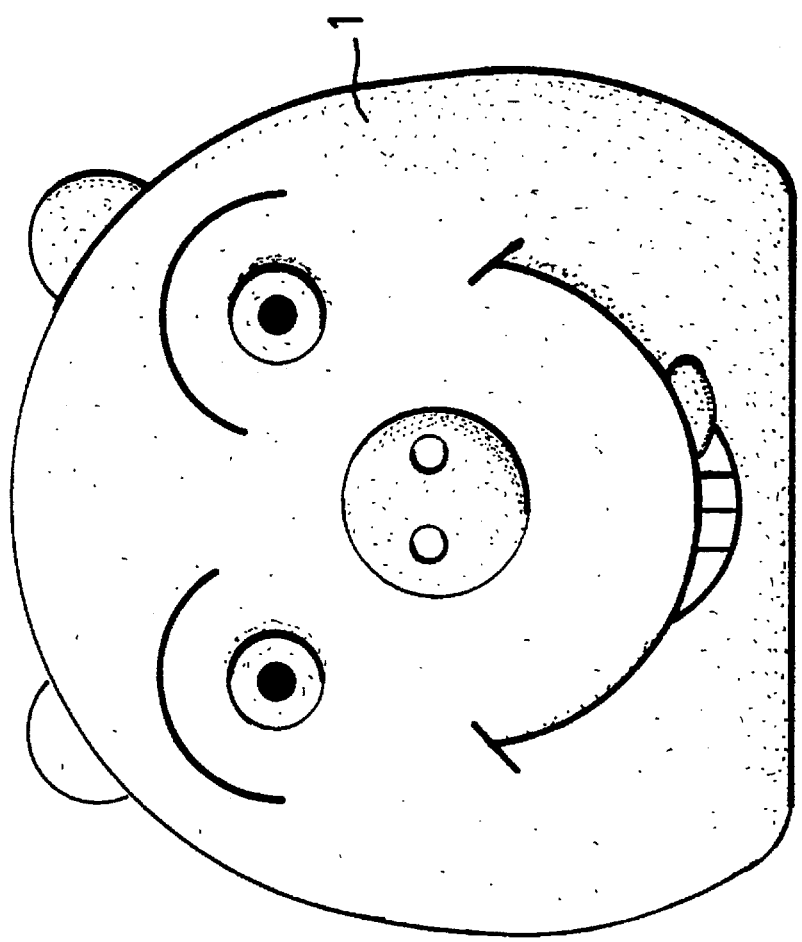
FIG. 3 shows a perspective view of the present invention.

As shown in FIGS. 1–6, the multiple electrical socket of the present invention comprises a housing 1, a base 2, two reels 3, two fastening blocks 4, a shaft 5, and two extension cords 6 of a predetermined length.

The housing 1 has an external appearance similar to the profile of an animal.

The base 2 is disposed securely in the interior of the housing 1 and is of a U-shaped construction. The base 2 is provided respectively in two opposite side walls thereof with a retaining recess 20 and a plurality of retaining holes 21.

The two reels 3 are provided respectively in one side thereof with a receiving space 30 in which a winding spring 31 is located in such a manner that one end of the spring 31 is fastened with the surface of the receiving space 30. The two reels 3 are provided respectively in another side thereof with a locating space 32 having at the bottom thereof two concentric conductive rings 33 and 331.

The two fastening blocks 4 are provided respectively in one side thereof with a protruded body 40 corresponding in location to the locating space 32 of the reel 3. The protruded body 40 is provided with two elastic metal pieces 41 and 42, which are corresponding in location to the conductive rings 33 and 331. The fastening block 4 is further provided between two sides thereof with a clamping space 43 which is provided in the inner wall thereof with a retaining portion 44 corresponding in location to the retaining hole 21 of the base 2.

The shaft 5 has two ends which are engaged respectively with a reel 3 and a fastening block 4. The clamping space 43 of the fastening block 4 is corresponding in location to one side of the base 2. As a result, both ends of the shaft 5 are received securely and respectively in the retaining recess 20. In the meantime, the retaining portion 44 of the fastening block 4 is located securely in the retaining hole 21. The shaft 5 is provided with a locating slit 50 in which one end of the spring 31 is located.

The two extension cords 6 are wound respectively on the reel 3 such that the extension cord 6 is fastened at one end thereof with the conductive rings 33 and 331 of the reel 3 and at another end thereof with an electrical socket 60.

Figure 4:
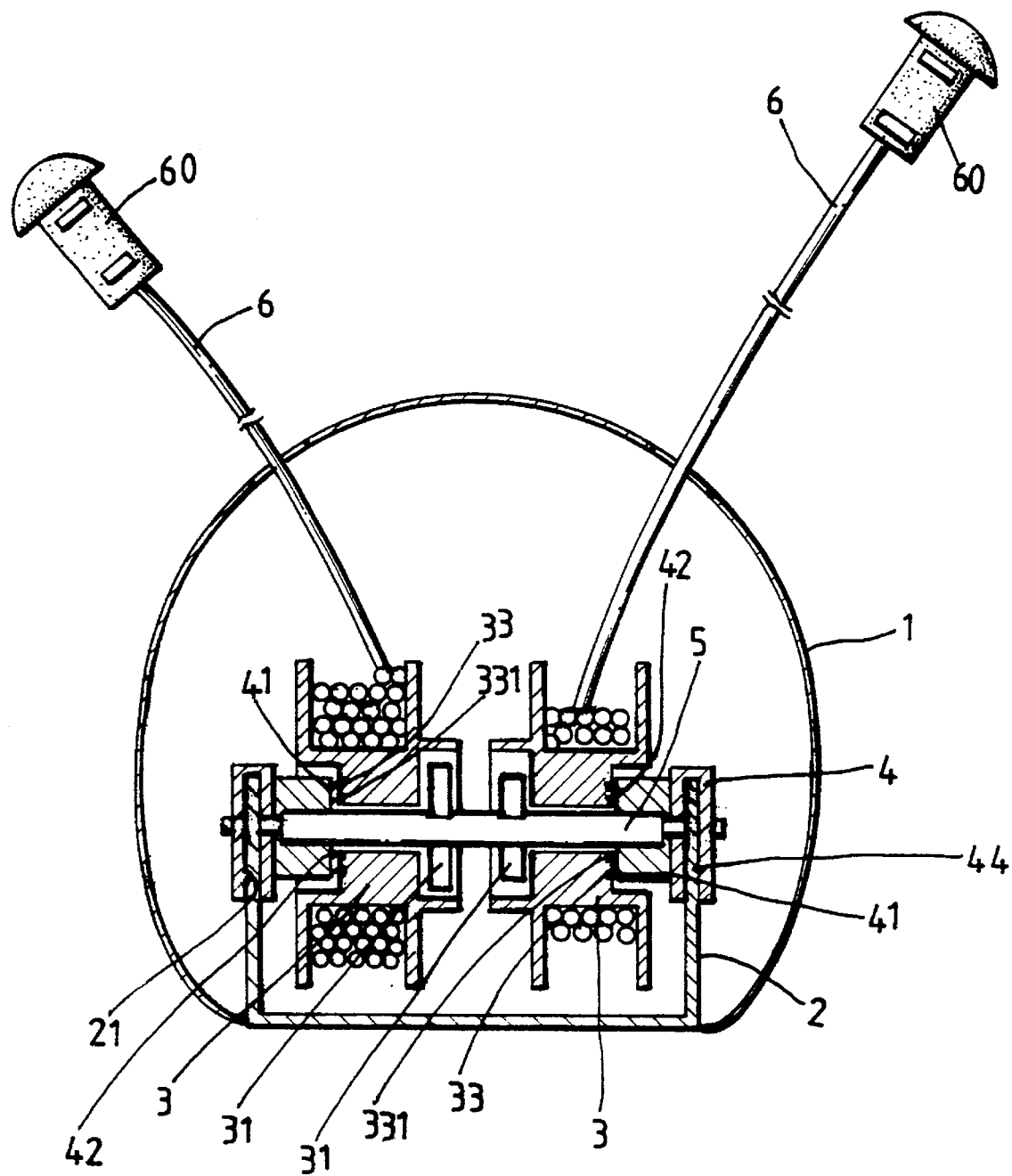
FIG. 4 shows a schematic view of the present invention at work.
Figure 5:
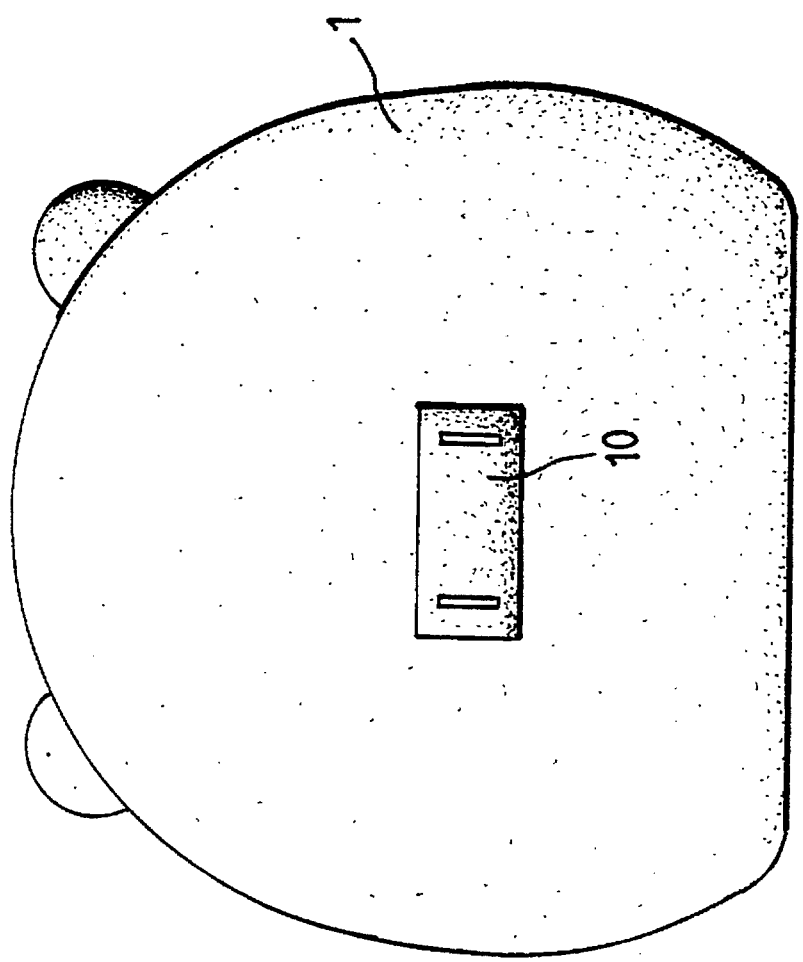
FIG. 5 shows a rear view of the present invention.
Figure 6:
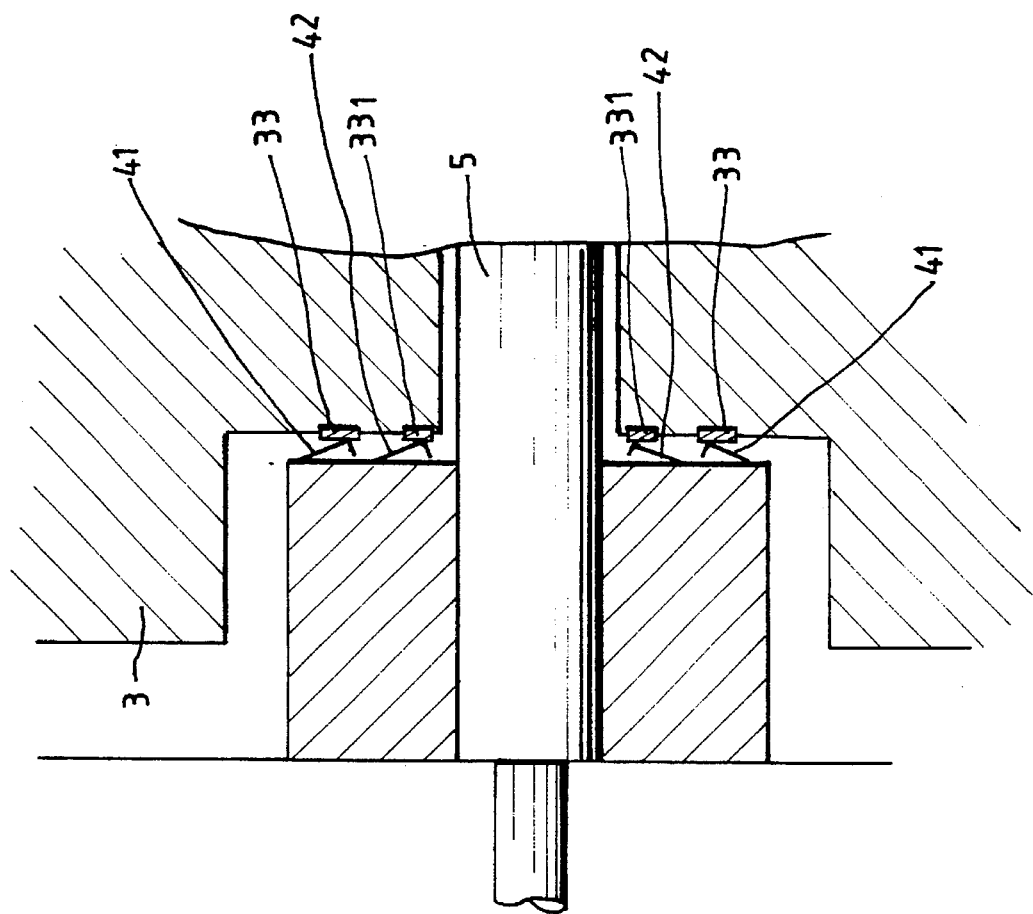
FIG. 6 shows a schematic view of a portion indicated by a circle A as shown in FIG. 1.

As illustrated in FIGS. 1 and 5, as a plug 10 of the present invention is engaged with an external power source, the power in made available to the fastening block 4 and is then transmitted to the extension cord 6 via the metal pieces 41 of the fastening block 4 and the conductive rings 33 of the reel 3. The extension cord 6 can be pulled out, as shown in FIG. 4. As the extension cord 6 is pulled out to actuate the reel 3 to turn, the winding spring 31 is also actuated to rotate to become tightened up, thereby causing the metal pieces 41 and 42 to make contact respectively with the conductive rings 33 and 331, as shown in FIG. 6

The extension cord 6 can be retracted by a returning force of the spring 31. Accordingly, the socket 60, which is fastened to the outer end of the retractable extension cord 6, can be retracted.

It is readily apparent that the present invention has inherent advantages, which are described explicitly hereinafter.

The extension cord 6 of the present invention can be so pulled out as to permit the socket 60 to be located as desired.

The extension cord 6 of the present invention can be so retracted by the returning force of the spring 31 to wind on the reel 3 located in the housing 1. This is an ingenious way to store the extension cord of the socket when the socket is not in use.

The present invention is so esthetically designed that it can be used as decoration when it is not used as an electrical socket.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. A multiple electrical socket comprising:

a housing having an animal profile;

a base disposed in said housing;

at least two reels provided respectively in one side thereof with a receiving space in which a winding spring is located in such a manner that one end of said winding spring is fastened to an inner wall of said receiving space, said reels further provided respectively in another side thereof with a locating space in which two conductive rings are disposed concentrically;

a predetermined number of fastening blocks corresponding in location to said reels, said fastening blocks provided respectively with a clamping space located between two sides thereof, said fastening blocks further provided respectively with a protruded body corresponding in location to said locating space of said reel, said protruded body provided thereon with two elastic metal pieces corresponding in location to said two conductive rings;

a shaft on which said reels and said fastening blocks are mounted, said shaft being fastened at both ends thereof with said base such that one end of said winding spring is fastened to said shaft; and at least two extension cords wound respectively on said reels such that said extension cords are fastened respectively at one end thereof to a pair of said conductive rings and at another end thereof with a respective electrical socket.

2. The multiple electrical socket as defined in claim 1, wherein said base is provided respectively in both sides thereof with a retaining recess in which one end of said shaft is located.

3. The multiple electrical socket as defined in claim 1, wherein said base is provided respectively in both sides thereof with a plurality of retaining holes; and wherein said clamping space of said fastening block is provided in an inner wall there with a plurality of retainers engageable securely with said retaining holes of said base.

4. The multiple electrical socket as defined in claim 1, wherein said shaft is provided with at least two locating slits for holding therein securely one end of said winding spring.

* * * * *